(12) United States Patent
DeCusatis et al.

(10) Patent No.: US 9,794,128 B2
(45) Date of Patent: Oct. 17, 2017

(54) OVERLAY NETWORK MOVEMENT OPERATIONS

(71) Applicant: INTERNATIONAL BUSINESS MACHINES CORPORATION, Armonk, NY (US)

(72) Inventors: Casimer M. DeCusatis, Poughkeepsie, NY (US); Mircea Gusat, Langnau (CH); Vinit Jain, Austin, TX (US); Keshav G. Kamble, Fremont, CA (US); Cyriel J. Minkenberg, Gutenswil (CH); Vijoy A. Pandey, San Jose, CA (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 14/144,367

(22) Filed: Dec. 30, 2013

(65) Prior Publication Data

US 2015/0188773 A1 Jul. 2, 2015

(51) Int. Cl.
*H04L 12/24* (2006.01)
*G06F 9/455* (2006.01)

(52) U.S. Cl.
CPC .......... *H04L 41/12* (2013.01); *G06F 9/45558* (2013.01); *G06F 2009/45595* (2013.01)

(58) Field of Classification Search
CPC . H04L 41/12; H04L 12/4641; H04L 12/4633; H04L 45/74; H04L 49/70
USPC ............ 370/221, 230, 254, 395.53; 709/222, 709/223, 224, 244
See application file for complete search history.

(56) References Cited

U.S. PATENT DOCUMENTS

| | | | |
|---|---|---|---|
| 7,730,183 B2 | 6/2010 | Brown et al. | |
| 7,986,638 B2 | 7/2011 | Ho et al. | |
| 9,515,947 B1* | 12/2016 | Lowe | H04L 12/4633 |
| 2009/0122801 A1* | 5/2009 | Chang | H04L 12/4645 |
| | | | 370/395.53 |

(Continued)

OTHER PUBLICATIONS

Jun, A.D.-S et al., "Virtual Network Resources Management: A Divide-and-Conquer Approach for the Control of Future Networks," Proceedings of the 1988 Global Telecommunications Conference (GLOBECOM 1998), The Bridge to Global Integration, IEEE, Nov. 8, 1988-Nov. 12, 1988, pp. 1065-1070, vol. 2, United States.

(Continued)

*Primary Examiner* — Charles C Jiang
*Assistant Examiner* — Wali Butt
(74) *Attorney, Agent, or Firm* — Sherman IP LLP; Kenneth L. Sherman; Steven Laut

(57) ABSTRACT

Embodiments of the invention relate to providing virtual network domain movement operations for overlay networks. One embodiment includes a method that includes determining one or more overlay network attributes (ONAs) for a plurality of virtual networks. The one or more ONAs are associated with the virtual networks. The one or more ONAs are managed as one or more portable entities by one or more of creating ONAs, deleting ONAs, moving ONAs, combining ONAs and dividing ONAs. A movement operation is performed on the one or more virtual networks among one or more servers of one or more overlay networks based on the management of the one or more ONAs.

20 Claims, 17 Drawing Sheets

(56) References Cited

U.S. PATENT DOCUMENTS

| | | | |
|---|---|---|---|
| 2011/0038256 A1* | 2/2011 | Joseph | H04L 41/022 370/221 |
| 2011/0103389 A1* | 5/2011 | Kidambi | H04L 45/586 370/395.1 |
| 2011/0110268 A1 | 5/2011 | Panasyuk et al. | |
| 2011/0320821 A1 | 12/2011 | Alkhatib et al. | |
| 2012/0278802 A1 | 11/2012 | Nilakantan et al. | |
| 2013/0044631 A1 | 2/2013 | Biswas et al. | |
| 2013/0091261 A1 | 4/2013 | Barabash et al. | |
| 2013/0297768 A1* | 11/2013 | Singh | H04L 12/2602 709/224 |
| 2014/0006585 A1* | 1/2014 | Dunbar | H04L 41/00 709/223 |
| 2014/0056151 A1* | 2/2014 | Petrus | H04L 69/22 370/242 |
| 2014/0092907 A1* | 4/2014 | Sridhar | H04L 45/74 370/392 |
| 2014/0233569 A1* | 8/2014 | Yong | H04L 45/64 370/392 |

OTHER PUBLICATIONS

Mell, P. et al., "The NIST Definition of Cloud Computing", National Institute of Standards and Technology, Information Technology Laboratory, Oct. 7, 2009, pp. 1-2 Version 15, NIST, United States.

\* cited by examiner

```
ONA-0 = {
  VNID-0, (vport0,
  vport1, vport2,
  vport3), {tun-
  0,224.1.2.3, arp_tble0},
  vlan_table0},
  subdm_list0
}
```
1001

```
ONA-1 = {
  VNID-1, (vport5,
  vport6), {tun-1
  ,224.1.2.4, arp_tble1},
  vlan_table1},
  subdm_list1
}
```
1002

```
ONA-2 = {
  VNID-2, (vport7,
  vport8), {tun-2
  ,224.1.2.5, arp_tble2},
  vlan_table2},
  subdm_list2
}
```
1003

FIG. 10

OVERLAY NETWORK MOVEMENT OPERATIONS

BACKGROUND

Embodiments of the invention relate to overlay virtual environments and, in particular, movement operations for overlay networks.

Overlay network clients, such as Virtual Machines (VMs), need default gateways to provide routing functionality. In overlay networks, the data link layer (layer 2 of the Open Systems Interconnection (OSI) model (ISO/IEC 7498-1)) is concerned with moving data across the physical links in the network. In a network, the switch is a device that redirects data messages at the layer 2 level, using the destination Media Access Control (MAC) address to determine where to direct the message. Layer 2 contains two sublayers: the MAC sublayer and the logical link control (LLC) sublayer. Layer 2 ensures that an initial connection has been set up, divides output data into data frames, and handles the acknowledgements from a receiver that the data arrived successfully.

Network virtualization that use overlay networks allow for VM migration from one hypervisor to another. The hypervisors may be located on different Internet protocol (IP) subnets. Switches on the hypervisors encapsulate traffic for a destination VM's associated hypervisor before delivering the traffic to an IP cloud, and on the way to the destination hypervisor. A virtual network provides an administrative boundary established by a data center operator. A virtual network should provide the same or more functionality than physical networks that they are virtualizing.

BRIEF SUMMARY

Embodiments of the invention relate to providing virtual network movement operations for overlay networks. One embodiment includes a method that includes determining one or more overlay network attributes (ONAs) for a plurality of virtual networks. In one embodiment of the invention, the one or more ONAs are associated with the virtual networks. In one embodiment of the invention, the one or more ONAs are managed as one or more portable entities by one or more of creating ONAs, deleting ONAs, moving ONAs, combining ONAs and dividing ONAs. In one embodiment of the invention, a movement operation is performed on the one or more virtual networks among one or more servers of one or more overlay networks based on the management of the one or more ONAs.

Another embodiment comprises a computer program product for providing virtual networks movement operations. The computer program product comprises a computer readable storage medium having program code embodied therewith, the program code readable/executable by a processor to perform a method comprising: determining, by a physical network interface controller (NIC), one or more overlay network attributes (ONAs) for a plurality of virtual networks. In one embodiment, the physical NIC associates the one or more ONAs to the plurality of virtual networks. In one embodiment, the physical NIC manages the one or more overlay network attributes as one or more portable entities by one or more of creating ONAs, deleting ONAs, moving ONAs, combining ONAs and dividing ONAs. In one embodiment, the physical NIC performs a movement operation on the one or more virtual networks among one or more servers of one or more overlay networks based on the management of the one or more ONAs.

One embodiment comprises a system including a hardware layer comprising a physical NIC. In one embodiment, the system includes one or more virtual switches each associated with one or more virtual machines (VMs) overlaying the hardware layer and a first server. In one embodiment, the NIC determines one or more overlay network attributes (ONAs) for a plurality of virtual networks, associates the one or more ONAs with the plurality of virtual networks, manages the one or more overlay network attributes as one or more portable entities by one or more of creating ONAs, deleting ONAs, moving ONAs, combining ONAs and dividing ONAs, and performs a movement operation on the one or more virtual networks among one or more servers of one or more overlay networks based on management of the one or more ONAs.

These and other features, aspects, and advantages of the present invention will become understood with reference to the following description, appended claims, and accompanying figures.

BRIEF DESCRIPTION OF THE SEVERAL VIEWS OF THE DRAWINGS

FIG. 10 illustrates overlay network attributes (ONA), according to one embodiment of the invention;

DETAILED DESCRIPTION

Figure 1:
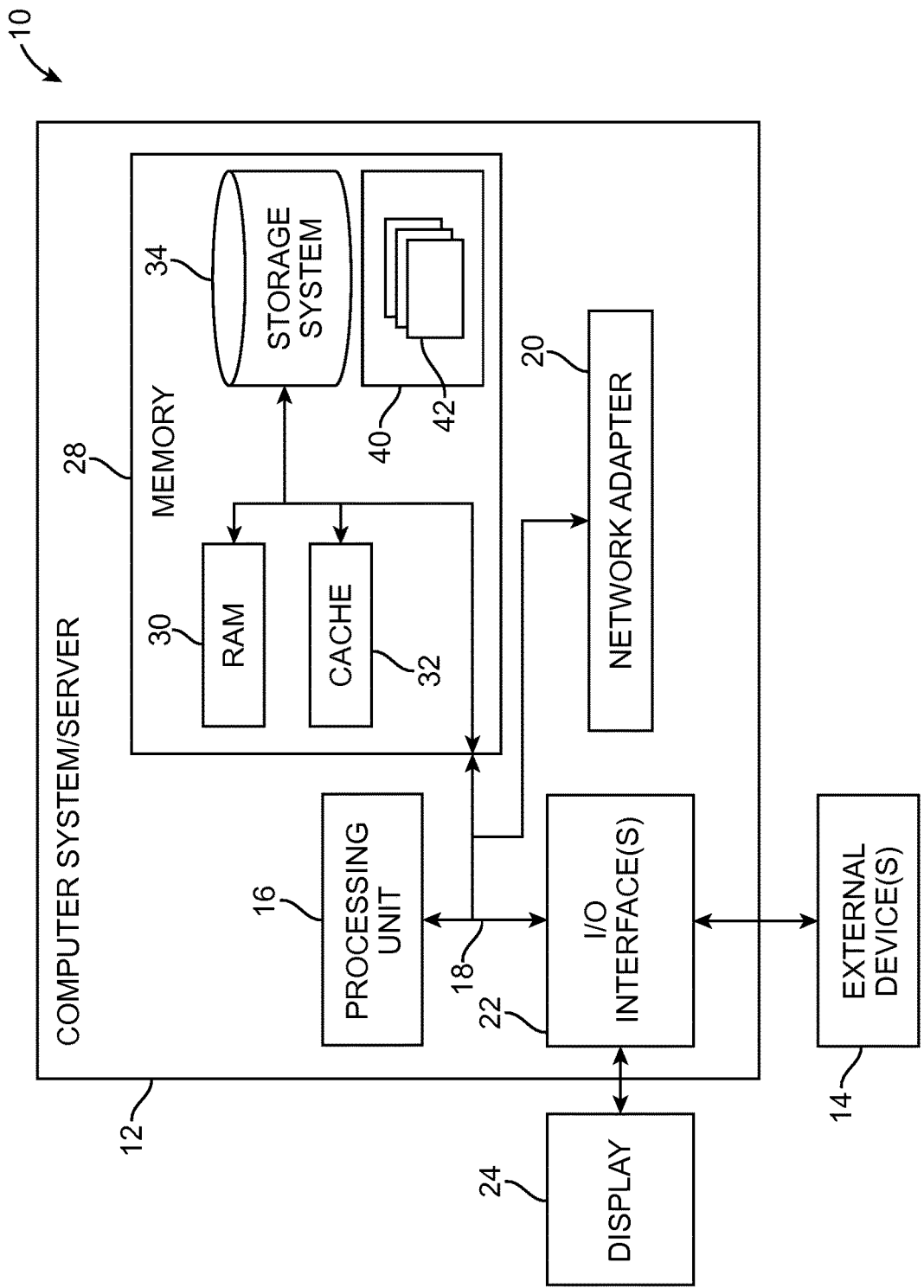
FIG. 1 depicts a cloud computing node, according to an embodiment of the present invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include a(n) Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile/non-volatile media, and removable/non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in a memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14, such as a keyboard, a pointing device, etc.; a display 24; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via a network adapter 20. As depicted, the network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, etc.

Figure 2:
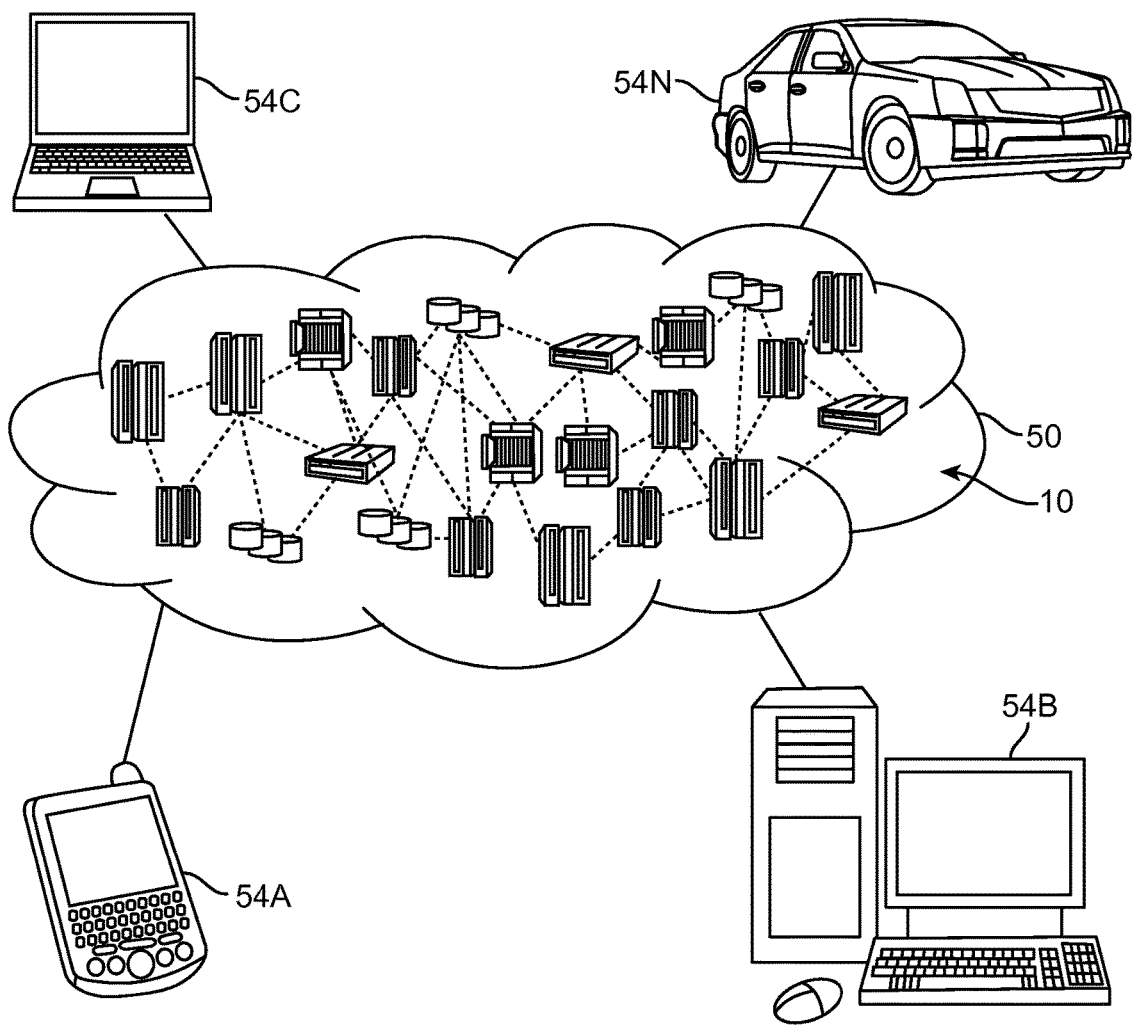
FIG. 2 depicts a cloud computing environment, according to an embodiment of the present invention.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
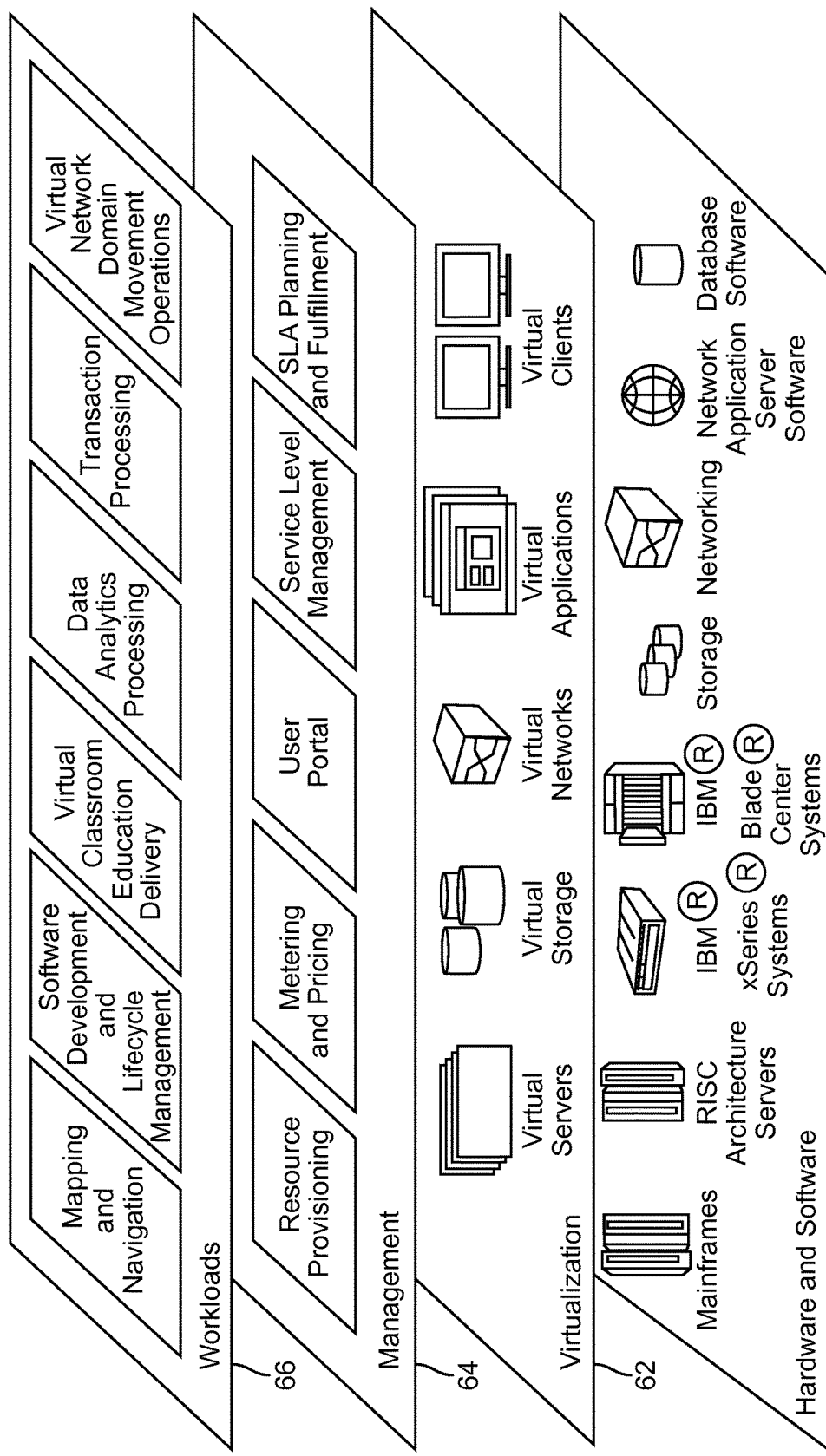
FIG. 3 depicts a set of abstraction model layers, according to an embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 includes hardware and software components. Examples of hardware components include mainframes. In one example, hardware components comprise IBM® zSeries® systems and RISC (Reduced Instruction Set Computer) architecture-based servers. In one example, hardware components comprise IBM pSeries® systems, IBM xSeries® systems, IBM BladeCenter® systems, storage devices, networks, and networking components. Examples of software components include network application server software. In one example, software components comprise IBM WebSphere® application server software and database software. In one example, software components comprise IBM DB2® database software. (IBM, zSeries, pSeries, xSeries, BladeCenter, WebSphere, and DB2 are trademarks of International Business Machines Corporation registered in many jurisdictions worldwide.)

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment and provide billing or invoicing for consumption of these resources. In one example, these resources may comprise application software licenses. Security provides identity verification for cloud consumers and tasks as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

A workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and virtual network and domain movement operations. As mentioned above, all of the foregoing examples described with respect to FIG. 3 are illustrative only, and the invention is not limited to these examples.

It is understood all functions of the present invention as described herein are typically performed by the system 1100 (FIGS. 11-14), 1500 (FIG. 15) or the system 1800 (FIG. 18), which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Embodiments of the invention relate to providing virtual network and domain movement operations for overlay networks. One embodiment includes a method that includes determining one or more overlay network attributes for a plurality of virtual networks. In one embodiment of the invention, the one or more overlay network attributes are managed as one or more portable entities for performing movement operations on one or more of the virtual networks. In one embodiment of the invention, a movement operation is performed on the one or more virtual networks among one or more servers of one or more overlay networks based on the management of the one or more overlay attributes.

One embodiment comprises a system including a hardware layer comprising a physical NIC. In one embodiment, the system includes one or more virtual switches each associated with one or more virtual machines (VMs) overlaying the hardware layer and a first server. In one embodiment, the NIC determines one or more overlay network attributes for a plurality of virtual networks, manages the one or more overlay network attributes as one or more portable entities for performing movement operations on one or more of the virtual networks, and performs a movement operation on the one or more virtual networks among one or more servers of one or more overlay networks based on management of the one or more overlay attributes.

Figure 4:
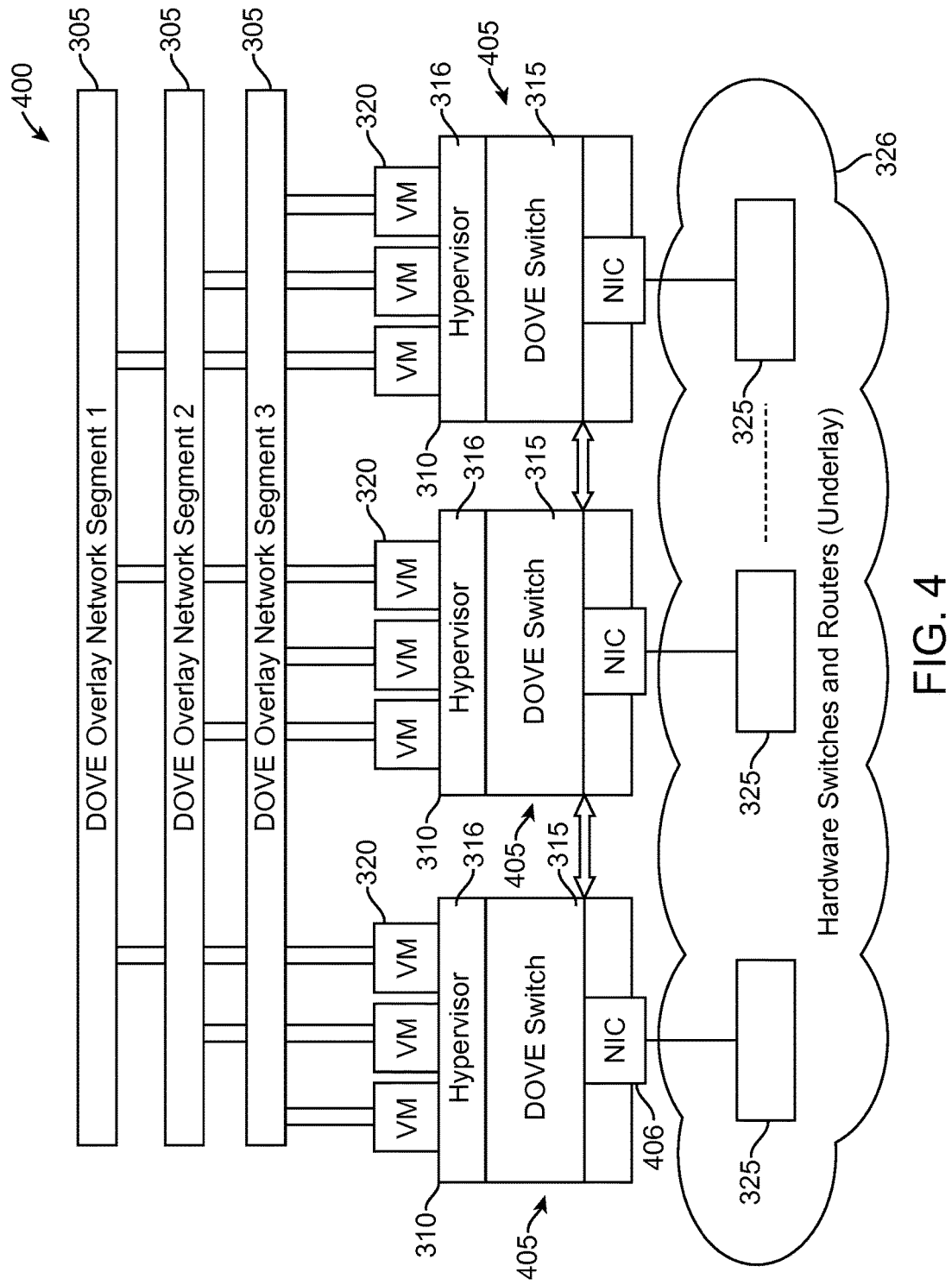
FIG. 4 is a block diagram illustrating a distributed overlay virtual environment for employing an embodiment of the present invention.

FIG. 4 shows a block diagram illustrating a distributed overlay virtual environment 400 for employing an embodiment of the present invention. In one embodiment, the distributed overlay virtual environment 400 may comprise a distributed overlay virtual Ethernet (DOVE) network system. The distributed overlay virtual environment 400 includes multiple virtual systems (or networks) 405 (also known as DOVE modules in one embodiment), each comprising a server 310 (or host) with a DOVE switch 315, hypervisor 316, VMs 320 and NIC 406, which overlay a physical layer 326 (e.g., including physical hardware and software processes) that may include physical switches 325, routers, servers, gateways, firewalls, etc. The physical layer 325 may also be referred to as the under layer. In one embodiment, overlay network segments 1-N 305 (e.g., overlay network segments 1-3) connect the multiple systems for communication of the different elements (e.g., hypervisors 316, VMs 320), where N is a positive number (e.g., 2, 3, 5, 10, etc.). The overlay network segments 1-N 305 may connect the different DOVE modules 405 as part of one or more subnets. It should be noted that while three systems 405 are shown, more (or less) systems 405 may be included in the distributed overlay virtual environment 400. In one embodiment, the virtual switches 315 comprise DOVE switches.

In one embodiment, the overlay network segments 1-N 305 create overlay networks between the hypervisors 316 and use encapsulation of packets, where packets originating from one VM 320 are encapsulated (e.g., adding overlay and physical network headers, e.g., tunnel headers) and the physical layer 325 (underlay) is used to deliver to a server 310 where the target VM 320 resides. In one embodiment, in the physical layer 325 an outer header is used by physical switches to forward packets, where an overlay identification (ID) in an encapsulation header provides traffic isolation. Incoming packets to a virtual switch 315 of a destination server 310 are decapsulated (e.g., the encapsulation headers are stripped from the packet) and delivered to a destination VM 320. In one embodiment, address independence between different virtual systems 405 is supported. For example, two different VMs 320 operating in two different systems 405 may have the same IP address and media access control (MAC) address. In another embodiment, two different VMs 320 operating in two different systems 405 may have a different IP address and a different media access control (MAC) address. As another example, the systems 405 support deploying VMs 320, which belong to the same system 405, to different hosts that are located in different physical subnets (includes switches and/or routers between the physical entities). In another embodiment, VMs 320 belonging to different systems 405 may be hosted on the same physical host. In yet another embodiment, the systems 405 support VM 320 migration anywhere in a data center without changing the VM 320 network address and losing its network connection.

In one embodiment, the systems 405 encapsulate data with physical path translations based upon policies (e.g., from a distributed policy service (DPS)), and send the encapsulated data between systems 405 that, in turn, is decapsulated and forwarded to a destination VM 320. In one embodiment, the policies describe, in a logical manner, how data is required to be sent over virtual networks without details of the underlying physical entities that perform particular tasks.

In one embodiment, the hypervisors 316 (e.g., VM 320 managers) allow multiple operating systems (e.g., VMs, such as VMs 320) to run concurrently on a host computer. A hypervisor 316 provides abstraction of physical resources to the VMs 320. For example, a physical NIC may be abstracted as a virtual NIC (vNIC) of a system 405. In one embodiment, a virtual switch 315 is a software manifestation of an Ethernet switch in the hypervisor 316 for providing connectivity for VMs 320.

In typical underlay networks, a default gateway is a device that passes traffic from a local subnet to devices on other subnets. The default gateway often connects a local network to the Internet, although internal gateways for local networks may also exist. On home or small business networks with a broadband router to share the Internet connection, the home router serves as the default gateway. On home or small business networks without a router, such as for residences with dialup Internet access, a router at the Internet Service Provider location serves as the default gateway. Default network gateways may also be configured using an ordinary computer instead of a router. These gateways may use two network adapters, one connected to the local subnet and one connected to the outside network. Either routers or gateway computers may be used to network local subnets such as those in larger networks.

In one embodiment, a virtual default gateway may be created using virtual switches 315 and use implicit routing of communications, which is the ability of the virtual gateway to perform all routing actions necessary and also prepare a packet from a VM 320 for final delivery. In one embodiment, users may specify the default gateway IP address and possibly a MAC address to be used. When VMs 320 use address resolution protocol (ARP) for their default gateway, in one embodiment, the virtual switches 315 to whom they connect will respond, irrespective of the virtual switch 315 to which the VM 320 connects. It should be noted that ARP maps addresses between the data link layer and the network layer of the overlay network.

Figure 5:
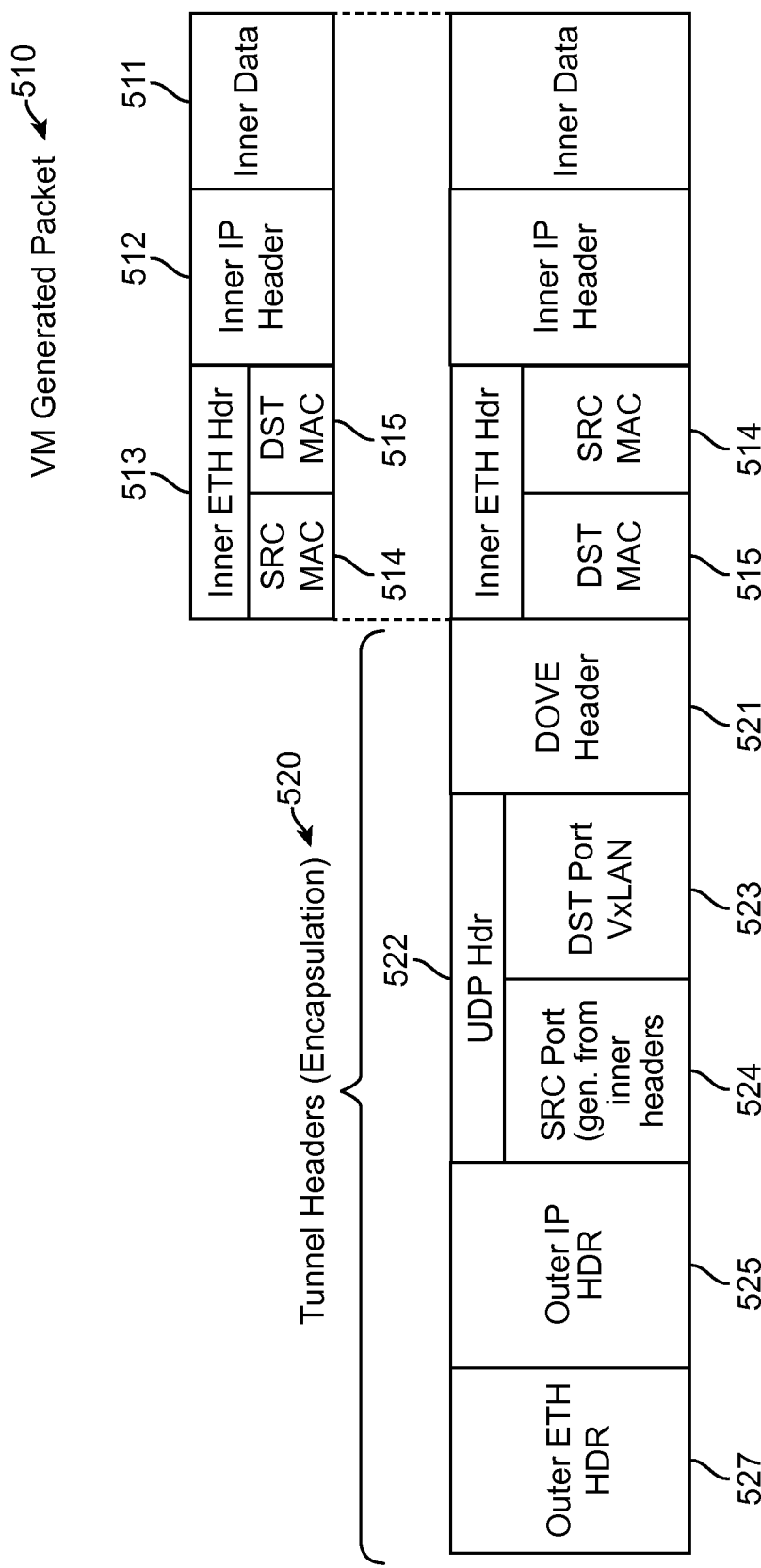
FIG. 5 illustrates an encapsulation format that may be used, in accordance with an embodiment of the invention.

FIG. 5 illustrates an example encapsulation format that may be used, in accordance with an embodiment of the invention. In one embodiment, an original packet 510 may comprise an inner Ethernet header 513 including a source MAC address 514 and a destination MAC address 515, an inner IP header 512 (including an IP address) and inner data 511 (i.e., payload information). The original packet 510 is desired to be communicated from one VM 320 to another VM 320. In one embodiment, the original packet 510 is encapsulated by a system 405 by adding tunnel (encapsulation) formatted fields 520, such as an outer Ethernet header 527 (e.g., MAC address), outer IP Header 525 (e.g., source IP address (SIP), outer destination IP address (DIP), etc.), user datagram protocol (UDP) header 522 including a source port 524 (generated from inner headers) and destination port 523 (e.g., for VxLAN), and the DOVE header 521 (e.g., also known as an encapsulation protocol (EP) header). In one embodiment, the DOVE header 521 may comprise a format for a specific EP type, such as VxLAN, NVGRE, etc. In one embodiment, each virtual switch 315 supports specific tunneling translation EP formats. If an encapsulated packet is sent to a VM 320 associated with a virtual switch 315 that does not support the EP type for the encapsulated packet, the packet must be formatted or translated (e.g., by a translation gateway) with an EP type that it can process.

In one embodiment, traffic from the VMs 320 (e.g., clients) is encapsulated within an IP tunnel and transmitted through the underlay network (e.g., physical network 325). Traffic in the underlay network follows normal networking paradigms (switching/routing based on MAC/IP addresses, Time-to-live (TTL) decrements, policy enforcement, etc.). Traffic from the overlay networks 405 is viewed as a payload in the underlay network and not used for any forwarding decisions. In one embodiment, VMs 320 in the overlay networks 405 have no knowledge of encapsulation being performed on the original VM packet 510. The VMs 320 continue to operate with knowledge of their respective IP addresses, IP subnets and default gateways that perform routing. In one example, if a source VM 320 with an IP address 10.10.10.10/24 needs to send an Ethernet packet 510 to a destination VM 320 with IP address of 20.20.20.10/24, the source VM 320 would forward the packet to its configured default gateway, and expect the gateway to perform the routing and forwarding. In one embodiment, the default gateway is a virtual default gateway where the virtual switch 315 of the source VM 320 in which the source and destination VMs 320 connect.

In one embodiment, the virtual switch 315 performs the routing necessary to deliver the source VM's 320 traffic to a destination VM 320. In one embodiment, the destination MAC address 515 (which was the gateway MAC address) is replaced with the destination VM's 320 MAC address. In one embodiment, TTL decrement is performed in the IP header of the packet. In one embodiment, the source virtual switch 315 encapsulates the resulting Ethernet packet into a tunneled packet and forwards the encapsulated packet to the underlay network 325. In one embodiment, the encapsulated packet is the packet that is delivered to the destination VM 320. In one embodiment, no further inner packet modifications are necessary, which is the idea behind implicit routing. In one embodiment, the virtual gateway is purely a virtual entity and is not physically located anywhere in the overlay/underlay network. In one embodiment, the virtual gateway is viewed as existing by the VMs 320 for satisfying the default gateway needs for the VMs 320 (clients).

Figure 6:
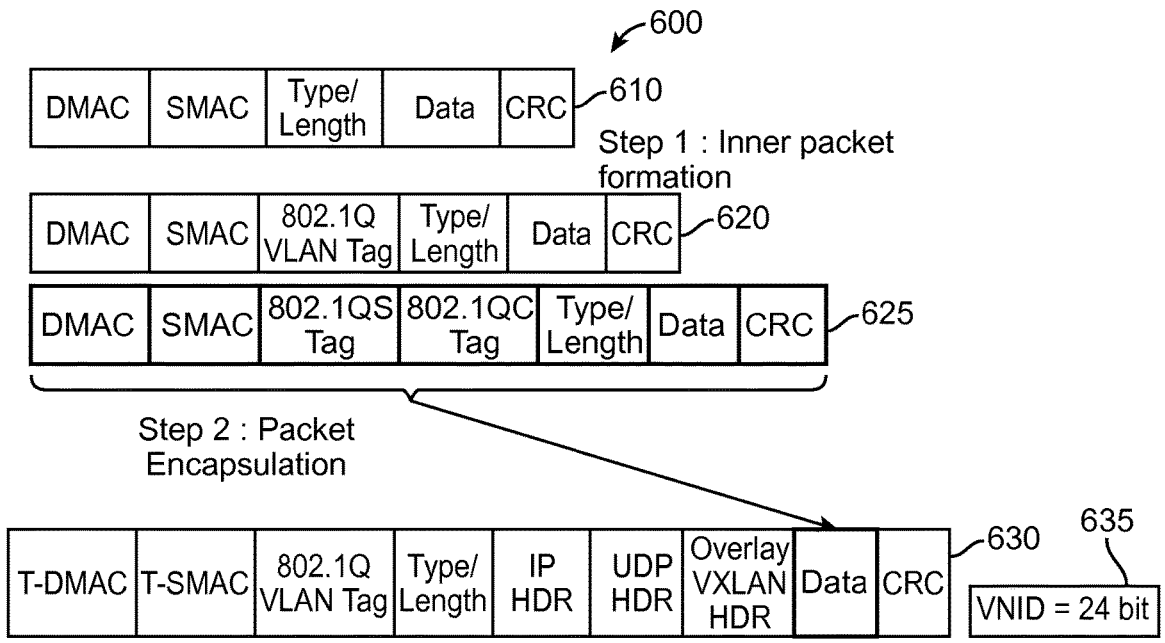
FIG. 6 illustrates packet encapsulation for a network virtualization using virtual extensible local area network (VXLAN) encapsulation used with an embodiment of the present invention.

FIG. 6 illustrates packet encapsulation 600 for a network virtualization using virtual extensible local area network (VXLAN) encapsulation that is used with an embodiment of the present invention. In one embodiment, packet encapsulation 600 starts with an L2 Ethernet frame or packet 610, that includes fields for a destination MAC (DMAC), a source MAC (SMAC), type/length, data and cyclic redundancy check (CRC). In one embodiment, the VLAN tag (also known as an IEEE 802.1Q tag) is added to the Ethernet frame 610 to form the packet 620. In one embodiment, when a switch receives an Ethernet frame 610, the frame will either already have a VLAN tag or the switch will insert a VLAN tag into the Ethernet header. If the Ethernet frame 610 was received from another switch, that switch will have already inserted the VLAN tag, while Ethernet frames 610 that come from network devices, such as computers, the Ethernet frame 610 will not have a VLAN tag. In one example, the multiple (e.g., four) bytes of data, which make up the VLAN tag, are inserted before the Type/Length field.

In one embodiment, the service provider VLAN tag (S Tag or 802.1Q S Tag) and the customer VLAN tag (C Tag or 802.1Q C Tag) are added to packet 620 to form packet 625. In one embodiment, the packet 625 is encapsulated to form the encapsulated packet 630, where the packet 625 is placed in a data field in the packet 630. In one embodiment, the packet 630 includes fields for tunnel destination MAC (T-DMAC), tunnel source MAC (T-SMAC), VLAN tag (or 802.1Q tag), type/length, IP header (IP HDR), UDP header (UDP HDR), overlay/VXLAN header, data (i.e., including packet 625) and CRC. In one embodiment, a 24-bit (e.g., enabling more than 16 million L2 (logical) networks to operate within a same administrative domain) Virtual Network Identifier (VNID) 635 identifies the Virtual Network (Overlay Network) that the packet 630 belongs to.

Figure 7:
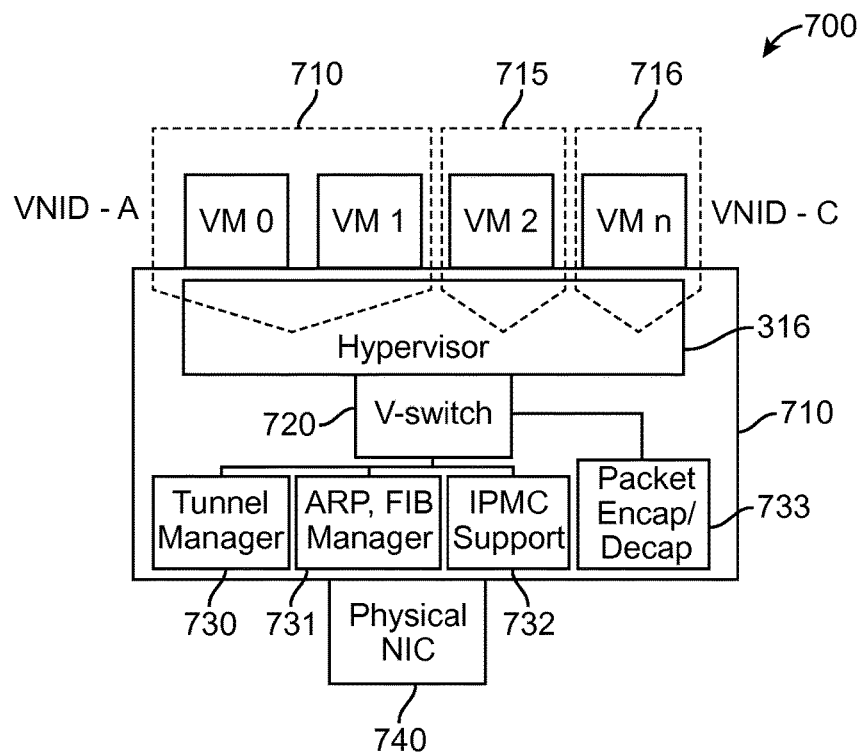
FIG. 7 is a block diagram showing an example VXLAN overlay network, used for employing an embodiment of the invention.

FIG. 7 is a block diagram showing an example VXLAN overlay network 700, used for employing an embodiment of the invention. In one example embodiment, the VXLAN overlay network 700 includes a server 710, hypervisor 316, virtual switch 720 that includes a tunnel manager 730, ARP, forward information base (FIB) manager 731, IP multicast (IPMC) support 732 and packet encapsulation/decapsulation module 733, a physical NIC 740 and multiple VMs that are part of different overlay networks. In one example, VM 0 and VM 1 are part of a virtual network identified by VNID-A 710, VM 2 is part of a virtual network identified by VNID-B 715, and VM n (where n is a positive number equal to or greater than 3) is part of a virtual network identified by VNID-C 716. In one embodiment, VXLAN overlay network 700 uses packet encapsulation 600 (FIG. 6) and decapsulation (e.g., reverse of encapsulation 600 to deliver the original Ethernet packet 610).

Figure 8:
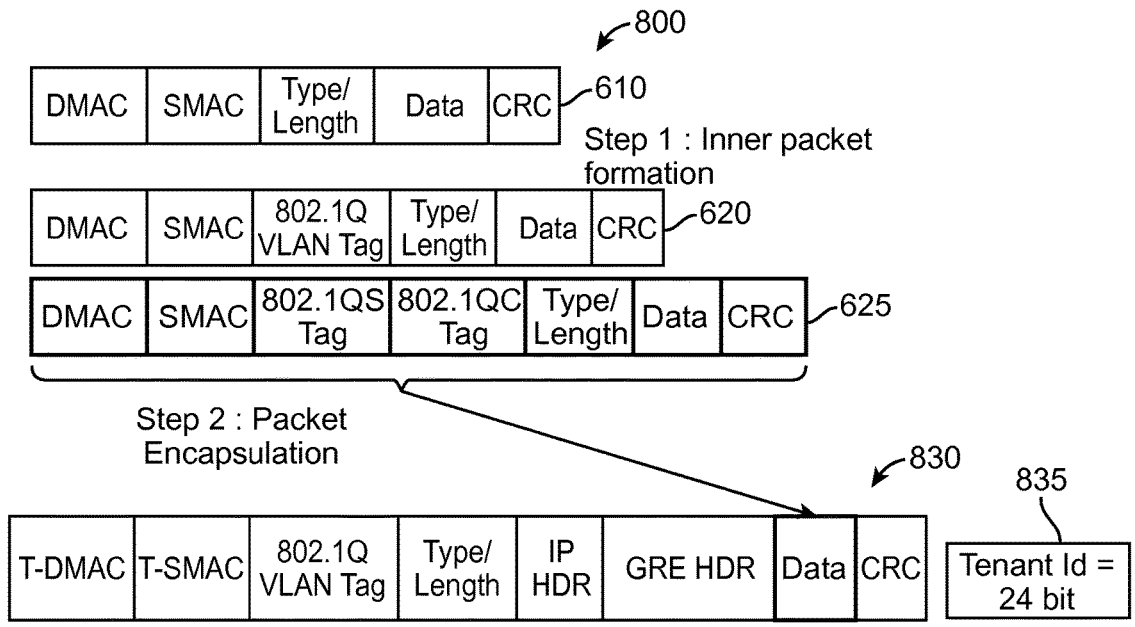
FIG. 8 illustrates packet encapsulation for a network virtualization using generic routing encapsulation (NVGRE) used with an embodiment of the present invention.

FIG. 8 illustrates packet encapsulation 800 for a network virtualization using generic routing encapsulation (NVGRE) that is used with an embodiment of the present invention. In one embodiment, packet encapsulation 800 starts with an Ethernet frame or packet 610, that includes fields for a DMAC, an SMAC, type/length, data and CRC. In one embodiment, the VLAN tag (also known as an IEEE 802.1Q tag) is added to the Ethernet frame 610 to form the packet 620.

In one embodiment, the service provider VLAN tag (S Tag or 802.1Q S Tag) and the customer VLAN tag (C Tag or 802.1Q C Tag) are added to packet 620 to form packet 625. In one embodiment, the packet 625 is encapsulated to form the encapsulated packet 830, where the packet 625 is placed in a data field in the packet 830. In one embodiment, the packet 830 includes fields for: T-DMAC, T-SMAC, VLAN tag (or 802.1Q tag), type/length, IP HDR, generic routing encapsulation (GRE) header, data (i.e., including packet 625) and CRC. In one embodiment, a 24-bit (e.g., enabling more than 16 million L2 (logical) networks to operate within a same administrative domain) tenant network identifier (TNID) 835 identifies the virtual network that the packet 630 belongs to. Each TNID 830 uniquely identifies a cloud tenant's unique virtual subnet. In one example, the NVGRE network (e.g., NVGRE network 900, FIG. 9) endpoint, residing in the server 710 (or a switch, or a physical NIC) encapsulates the VM traffic, adding the 24-Bit TNID 835, and sends it through a GRE tunnel. At the destination, the endpoint de-encapsulates the incoming packets 830 and presents the destination VM with the original Ethernet L2 packet 610.

Figure 9:
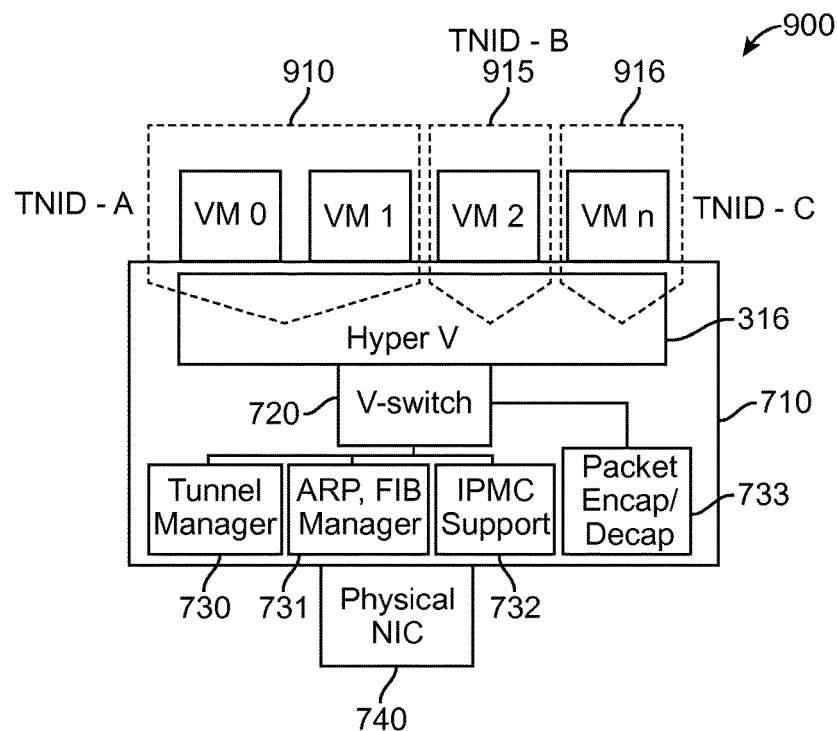
FIG. 9 is a block diagram showing an example NVGRE overlay network, used for employing an embodiment of the invention.

FIG. 9 is a block diagram showing an example NVGRE overlay network 900, used for employing an embodiment of the invention. In one example embodiment, the NVGRE overlay network 900 includes a server 710, hypervisor 316, virtual switch 720 that includes a tunnel manager 730, ARP, FIB manager 731, IPMC support 732 and packet encapsulation/decapsulation module 733, a physical NIC 740 and multiple VMs that are part of different overlay networks. In one example, VM 0 and VM 1 are part of a tenant network domain identified by TNID-A 910, VM 2 is part of a tenant network domain identified by TNID-B 915, and VM n (where n is a positive number equal to or greater than 3) is part of a tenant network domain identified by TNID-C 916. In one embodiment, NVGRE overlay network 900 uses packet encapsulation 800 (FIG. 8) and decapsulation (e.g., reverse of encapsulation 800).

FIG. 10 illustrates example overlay network attributes (ONA) 1001, 1002 and 1003, according to one embodiment of the invention. In one embodiment, ONAs 1001, 1002 and 1003 may include a VNID 635 or TNID 835, VM members or virtual port numbers, tunnels (e.g., tunnel ID, multicast group, ARPs, VLANs), sub-domains, etc. In one embodiment, each VXLAN and NVGRE overlay network includes ONAs (e.g., ONA 1001, 1002 or 1003, etc.). In one embodiment, the ONAs are associated with virtual networks based on identification (e.g., VNID 635 or TNID 835). In one embodiment, each ONA (e.g., ONA 1001, 1002 or 1003, etc.) is managed by the overlay network (e.g., by a physical NIC 740, FIGS. 11-14) as a portable entity by one or more of creating ONAs, deleting ONAs, moving ONAs, combining ONAs and dividing ONAs for performing movement operations on one or more of the virtual networks. In one embodiment, the movement operations may be based on creating ONAs, deleting ONAs, moving ONAs, combining ONAs or dividing ONAs.

In one embodiment of the invention, a movement operation is performed on one or more virtual networks between servers 710 (FIGS. 11-14) of different overlay networks based on the management of the ONAs (e.g., ONA 1001, 1002, 1003, etc.). In one embodiment, the movement operation of the one or more virtual networks based on ONA operations is based on a triggered event. In one example embodiment, the triggered event may be based on an administrator triggered event, a time triggered event, an overlay network resource requirement triggered event, etc.

In one embodiment, dividing of the one or more virtual networks based on dividing ONAs comprises splitting one or more ONAs (e.g., ONA 1001, 1002, 1003, etc.). In one example embodiment, moving of one or more virtual networks based on ONA operations comprises movement of one or more business divisions as virtual networks from one geographical location to another geographical location.

Figure 11:
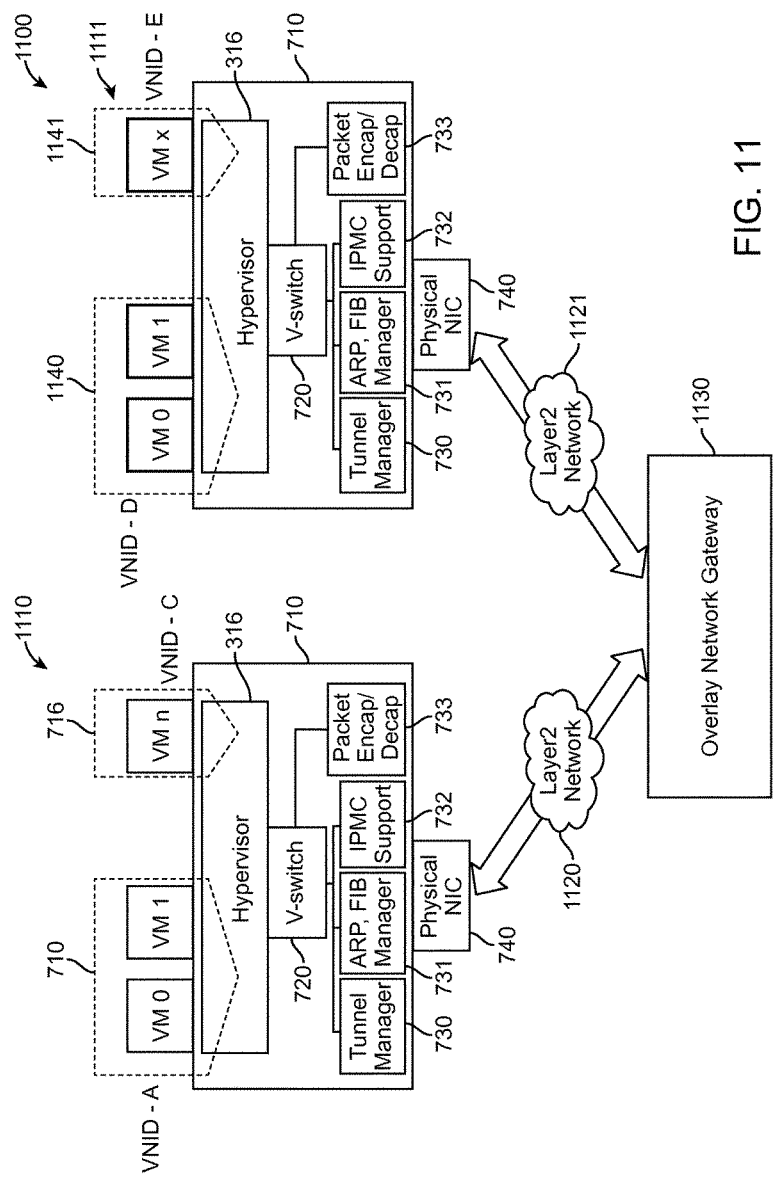
FIG. 11 illustrates a block diagram of an overlay network including hypervisors, physical network interface controller (NIC) and a gateway, according to one embodiment of the invention.

FIG. 11 illustrates a block diagram of an overlay network 1100 including hypervisors 316, physical NICs 740 and an overlay network gateway 1130 for multiple virtual overlay networks (e.g., VNID-A 710, VNID-C 716, VNID-D 1140 and VNID-E 1141 for multiple servers 710), according to one embodiment of the invention. In one embodiment, the overlay network 1110 communicates with the overlay network gateway 1130 through the layer 2 network path(s) 1120 and the overlay network 1111 communicates with the overlay network gateway 1130 through the layer 2 network path(s) 1121. In one embodiment, each VNID has ONAs that are managed as portable entities so that the ONAs may have movement operations performed, such as creating ONAs, deleting ONAs, moving ONAs, combining ONAs or dividing ONAs for performing the same movement operations on virtual networks.

Figure 12:
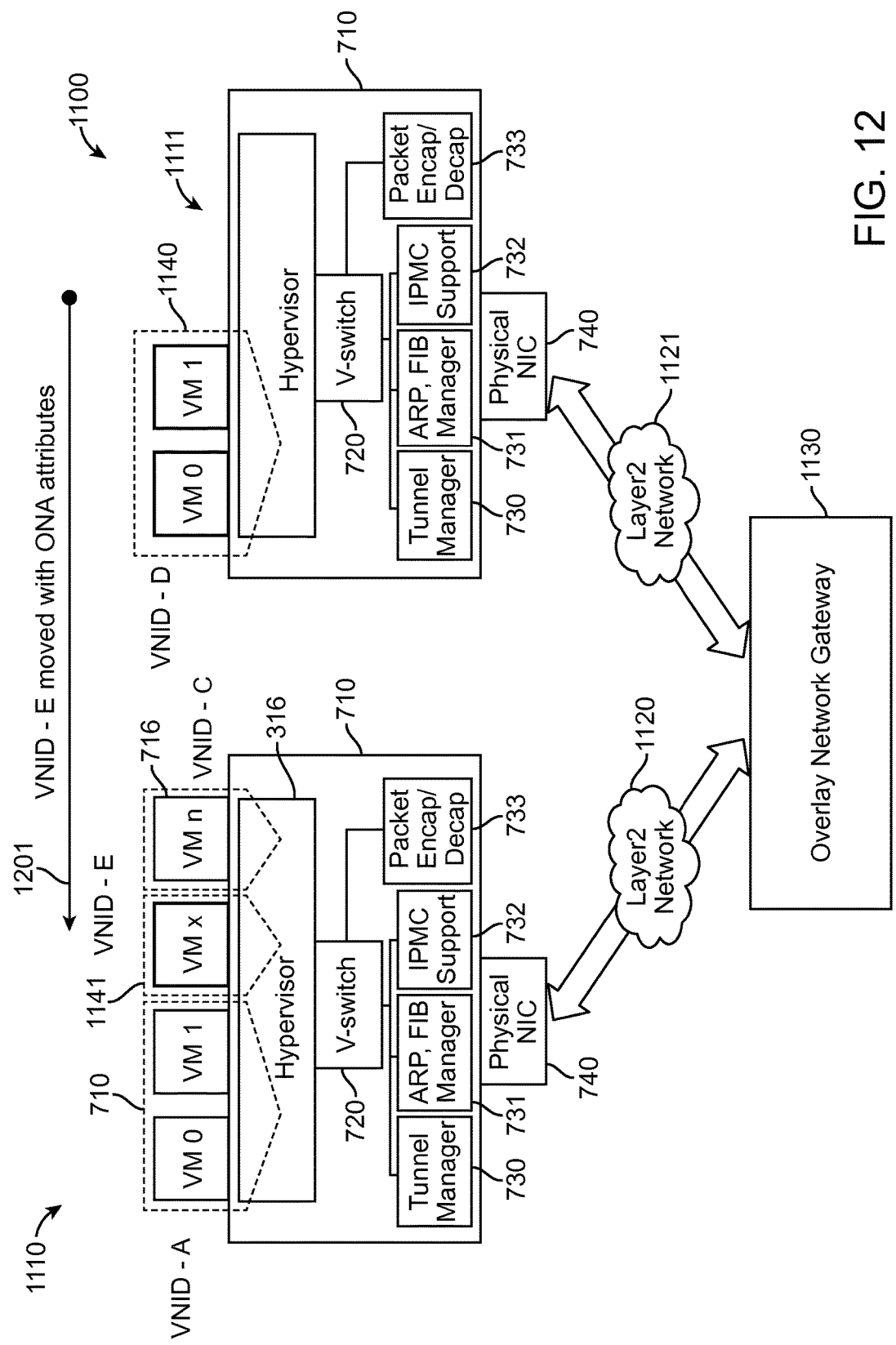
FIG. 12 illustrates a block diagram of an overlay network showing virtual overlay domain movement, according to one embodiment of the invention.

FIG. 12 illustrates a block diagram of an overlay network 1100 showing virtual overlay network movement, according to one embodiment of the invention. In one example embodiment, the virtual overlay network VNID-E 1141 has an ONA movement operation performed such that the VNID-E is moved (in the direction of arrow 1201) from the server 710 of the overlay network 1111 to the server 710 of the overlay network 1110. In one embodiment, the ONA for VNID-E 1141 is modified to identify the attributes associated with the overlay network 1110 components.

Figure 13:
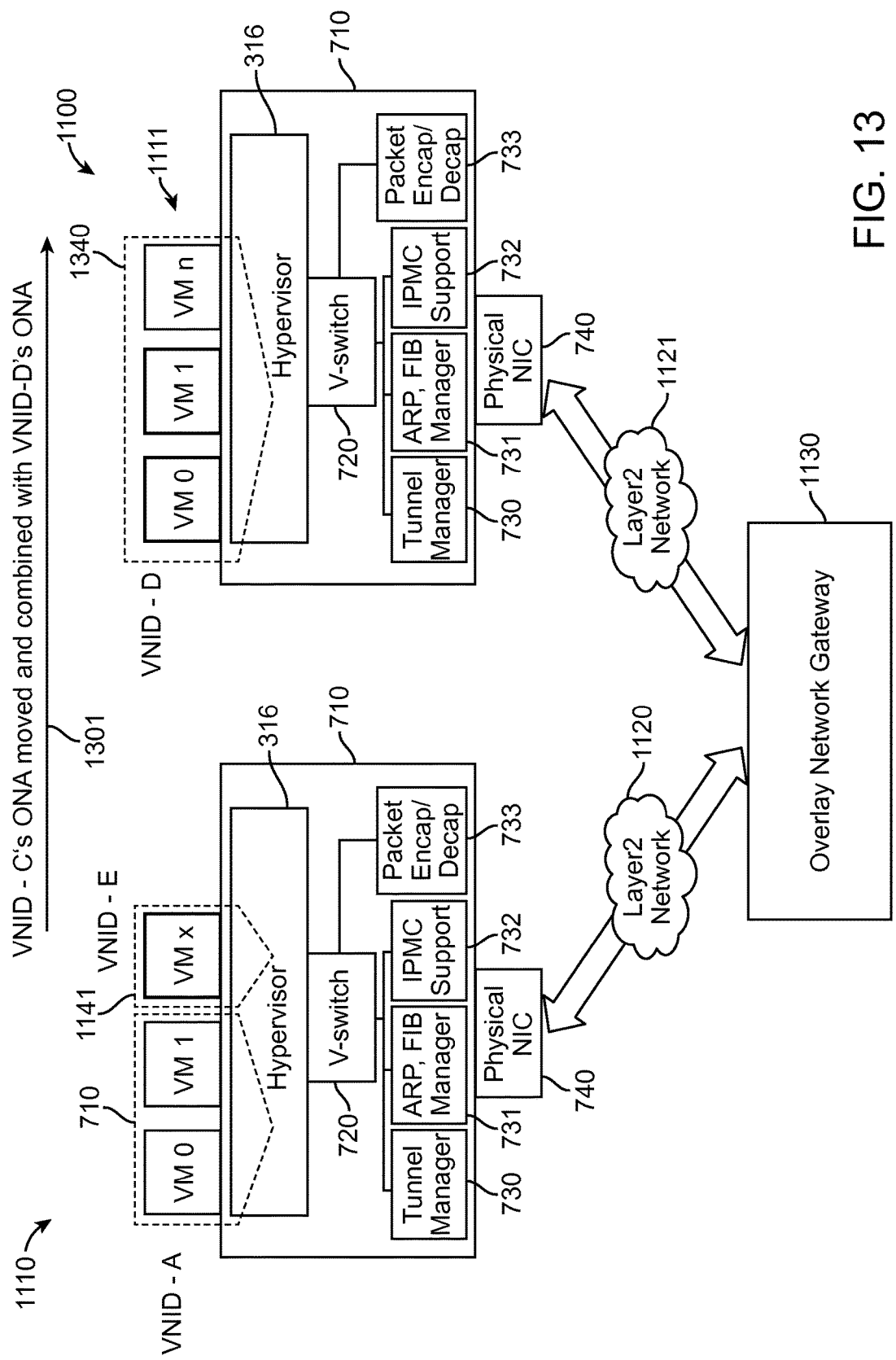
FIG. 13 illustrates a block diagram of an overlay network showing virtual overlay domain combining, according to one embodiment of the invention.

FIG. 13 illustrates a block diagram of an overlay network 1100 showing virtual overlay network combining based on ONA movement operations, according to one embodiment of the invention. In one example embodiment, the virtual overlay network VNID-D 1140 (FIG. 12) has an ONA combining movement operation performed such that VNID-C 716 is combined with the VNID-D 1140 and becomes a new combined VNID-D 1340 that includes VM 0, VM 1 and VM n. In one example the combining operation moves the VNID-C 716 to the VNID-D 1340 (i.e., the combination moves the VM n of the VNID-C 716 in the direction of arrow 1301 from the server 710 of the overlay network 1110 to the server 710 of the overlay network 1111. In one embodiment, the ONA for VNID-D 1340 is modified to identify the attributes associated with the newly combined overlay network 1111 components. In one embodiment, the ONAs of VNID-C 716 are now combined with those of the previous ONAs of VNID-D 1140 to become new combined ONAs for the new VNID-D 1340.

Figure 14:
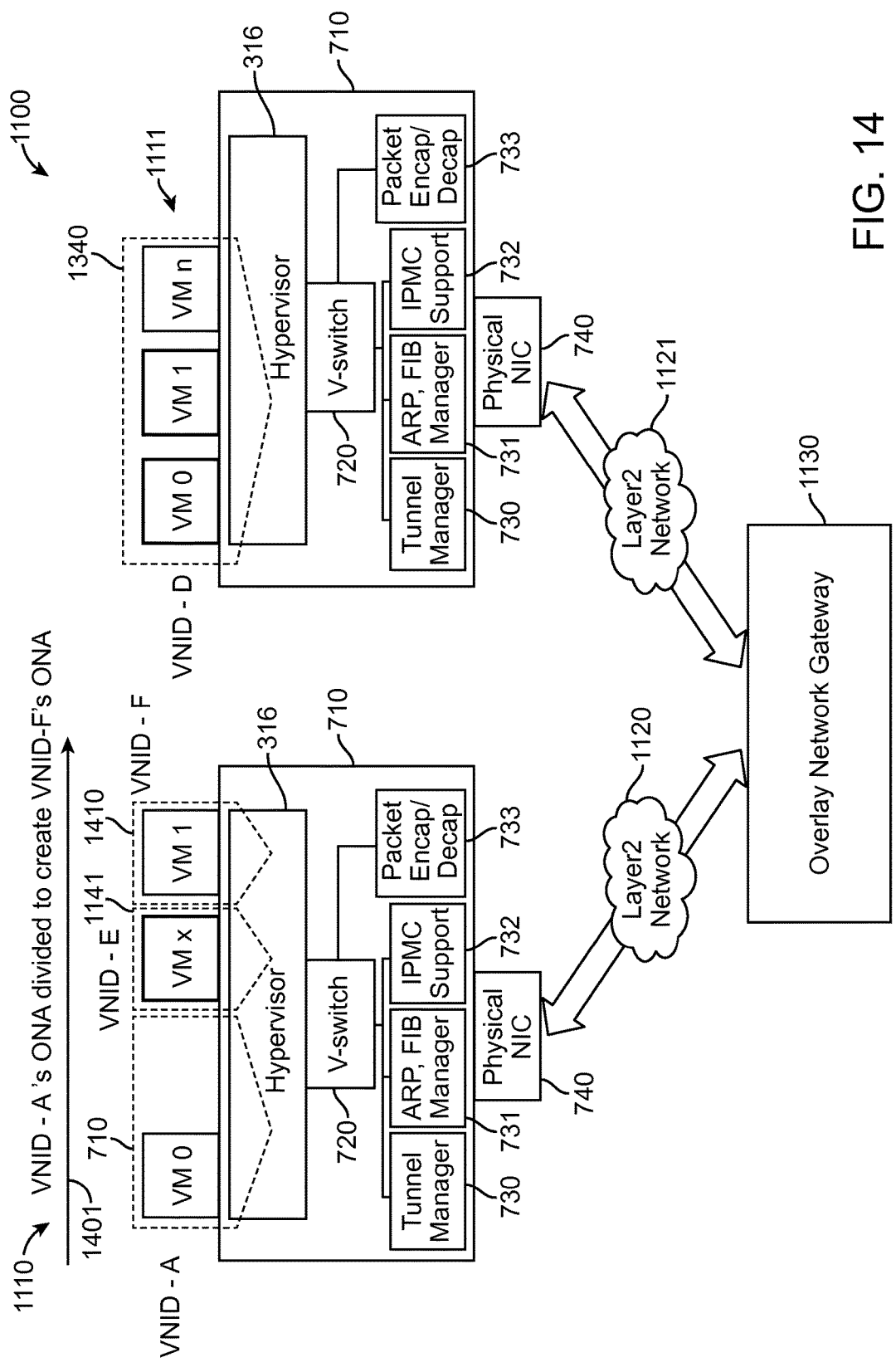
FIG. 14 illustrates a block diagram of an overlay network showing virtual overlay domain division, according to one embodiment of the invention.

FIG. 14 illustrates a block diagram of an overlay network 1100 showing virtual overlay network division based on ONA movement operations, according to one embodiment of the invention. In one example embodiment, the virtual overlay network VNID-A 710 has an ONA division movement operation performed such that VNID-F 1410 is formed with the VM 1 from the former VNID-A 710. In one example the division operation creates the VNID-F 1410 virtual network (i.e., the division moves the VM 1 of the VNID-A 710 in the direction of arrow 1401 on the same server 710 of the overlay network 1110. In one embodiment, the ONA for VNID-F 1410 is created to identify the attributes associated with the modified overlay network 1110 components. In one embodiment, the ONAs of VNID-A 710 are divided out so that part of the ONAs remain in VNID-A 710 and part of the ONAs are now associated with VNID-F 1410.

Figure 15:
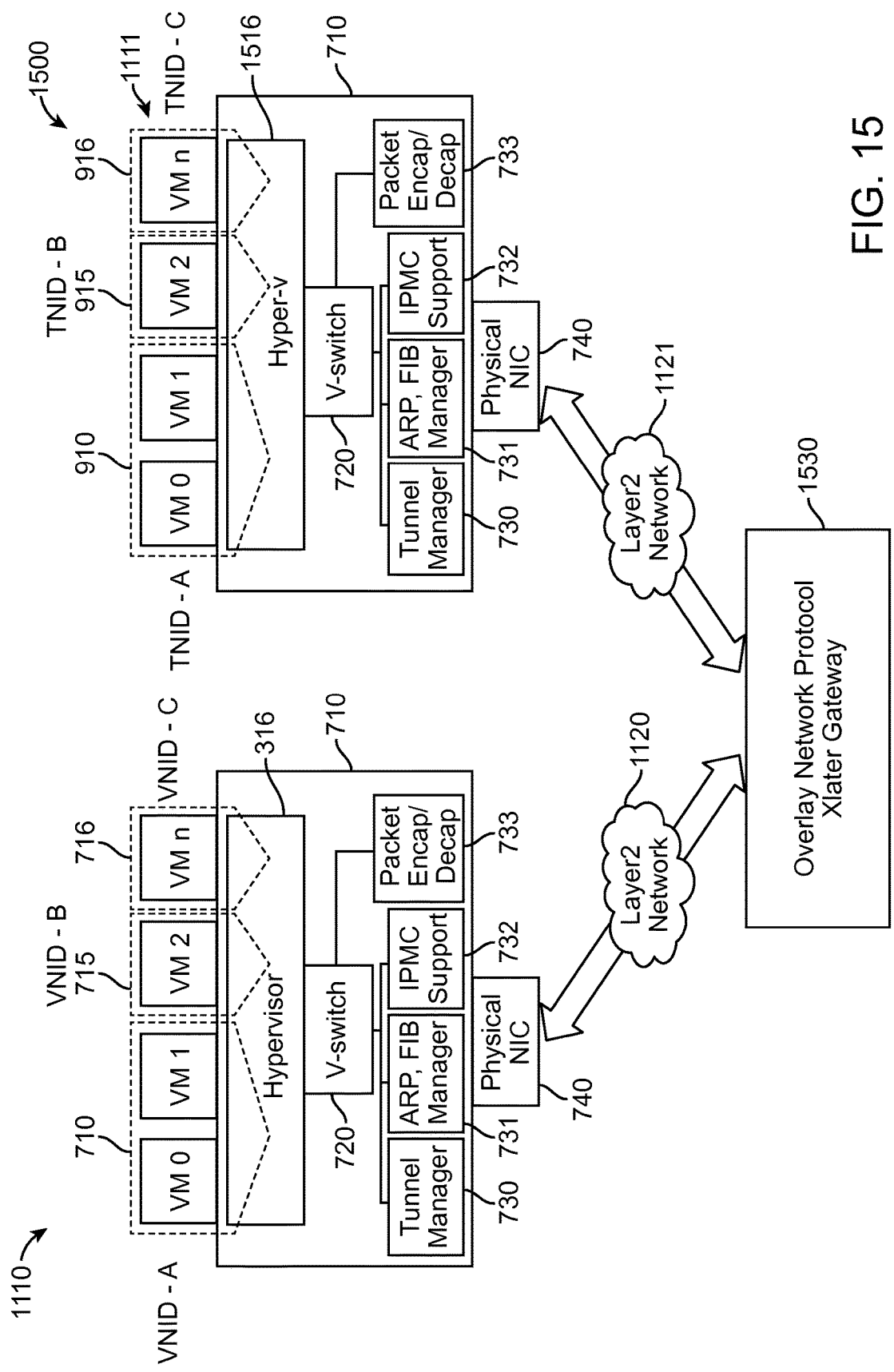
FIG. 15 illustrates a block diagram of a heterogeneous overlay network employing an embodiment of the invention.

FIG. 15 illustrates a block diagram of a heterogeneous overlay network 1500 employing an embodiment of the invention. In one embodiment, the heterogeneous overlay network 1500 includes the overlay networks 1110 and 1111, where the overlay network 1110 comprises a VXLAN overlay network and the overlay network 1111 now comprises a NVGRE overlay network with a Hyper-V 1516. In one embodiment, the VXLAN overlay network 1110 comprises VNID-A 710, VNID-B 715 and VNID-C 716, and the NVGRE overlay network comprises TNID-A 910, TNID-B 915 and TNID-C 916. In one embodiment, the heterogeneous overlay network 1500 comprises an overlay network protocol translator gateway 1530 that performs various operations for communication between the VXLAN overlay network 1110 and the NVGRE overlay network 1111. In one embodiment, the overlay network protocol translator gateway 1530 performs VNID and TNID mapping, bridging and routing based on lookup operations, and operates on the same or different virtual network identifications (IDs).

Figure 16:
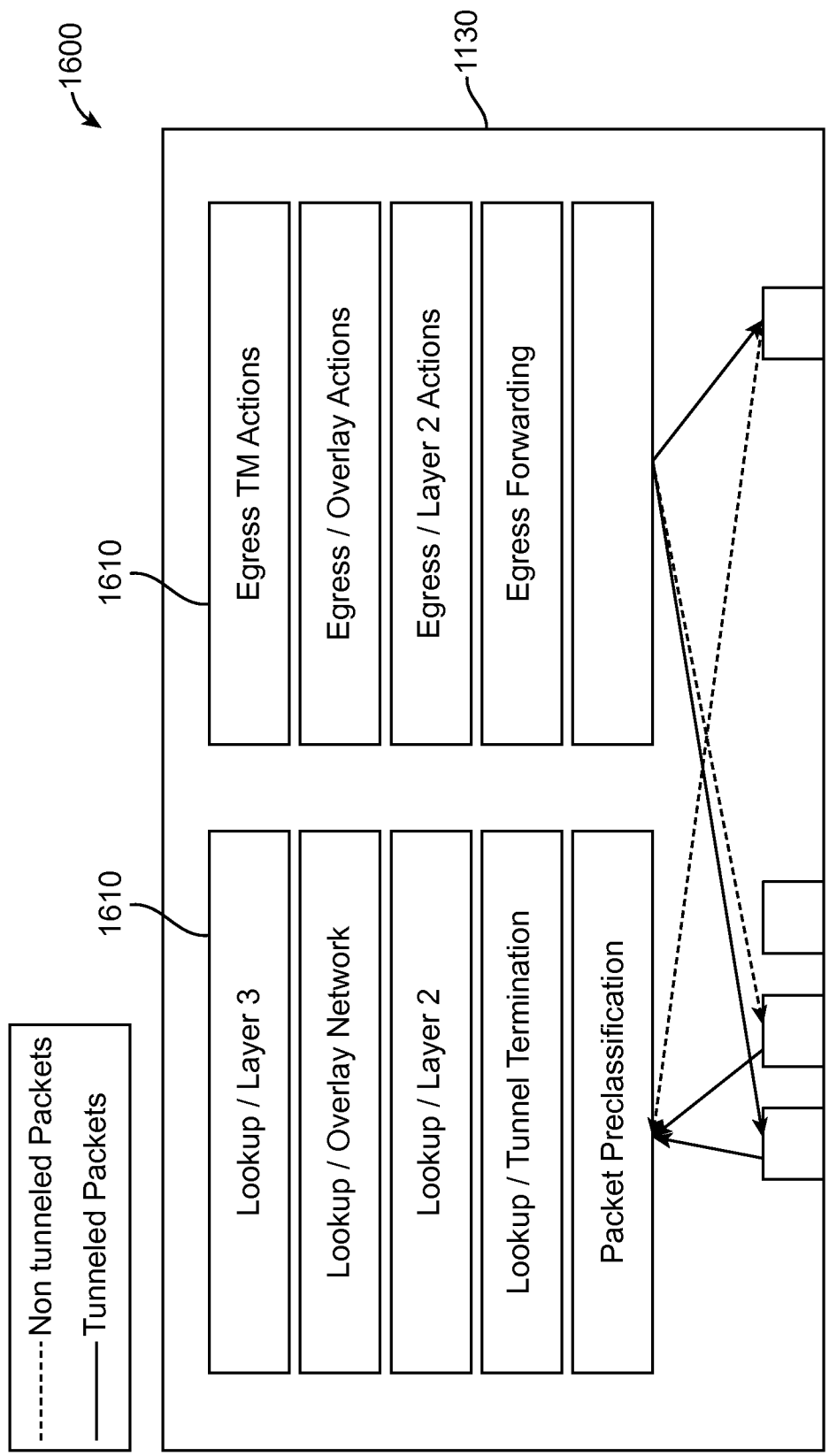
FIG. 16 is a block diagram showing overlay gateway functionality that may be offloaded to an NIC, according to one embodiment of the invention.

FIG. 16 is a block diagram showing overlay gateway functionality 1600 that may or may not be offloaded to an NIC (e.g., physical NICs 740), according to one embodiment of the invention. In one embodiment, the gateway 1130 (or gateway 1530) may perform functions 1610 that may include lookups for layer 3, lookups for overlay networks, lookups for layer 2, lookups for tunnel termination, packet reclassification, egress tunnel mapping (TM) actions, egress overlay actions, egress layer 2 actions, egress forwarding, etc. In one example, the non-tunneled packets and tunneled packet actions performed by the gateway 1130 (or gateway 1530) are distinguished by the arrows.

Figure 17:
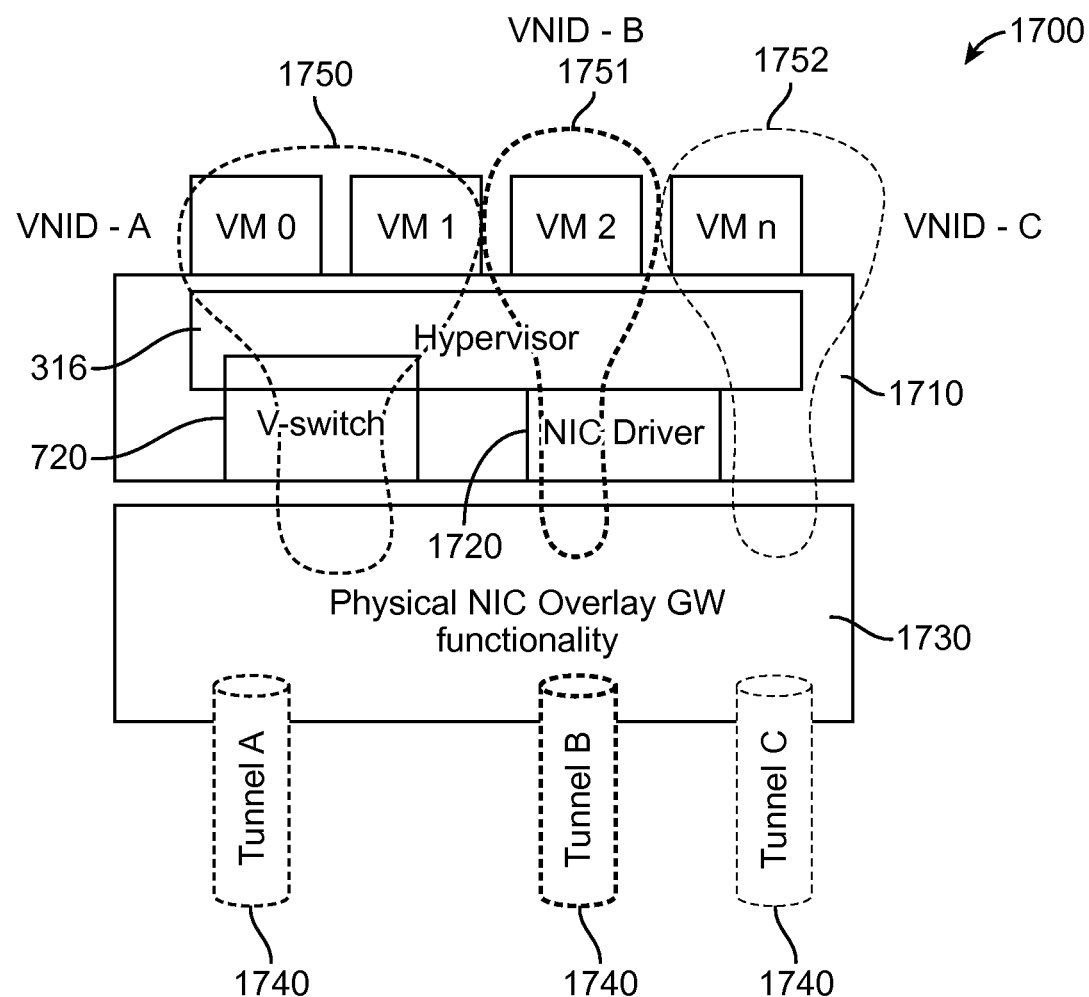
FIG. 17 is a block diagram showing a physical NIC with overlay network gateway functionality, according to one embodiment of the invention.

FIG. 17 is a block diagram showing a physical NIC 1730 with overlay network gateway functionality (e.g., offloaded functionality), according to one embodiment of the invention. In one embodiment, the overlay network 1700 includes VNID-A 1750, VNID-B 1751, VNID-C 1752, server 1710, hypervisor 316, virtual switch 720, an NIC driver 1720 and physical NIC 1730 showing tunnels 1740. In one embodiment, tunnels for opposite side of the network of virtual overlay networks (e.g., network 1800, FIG. 18) are terminated at the physical NIC 1730. In one embodiment the physical NIC 1730 performs outer packet processing based on tunnel conversion and performs bridging and routing functions (i.e., formerly performed by a gateway, e.g., gateway 1130 or gateway 1530). In one embodiment, the physical NIC 1730 performs gateway overlay network offloaded operations and optionally supports virtual Ethernet port aggregator (VEPA) operations. In one embodiment, as the gateway functional operations of gateway 1130 (or gateway 1530) are offloaded to the physical NIC 1730, the gateway 1130 (or gateway 1530) may not be required for some of the virtual overlay networks of a network of virtual overlay networks (e.g., network 1800, FIG. 18).

Figure 18:
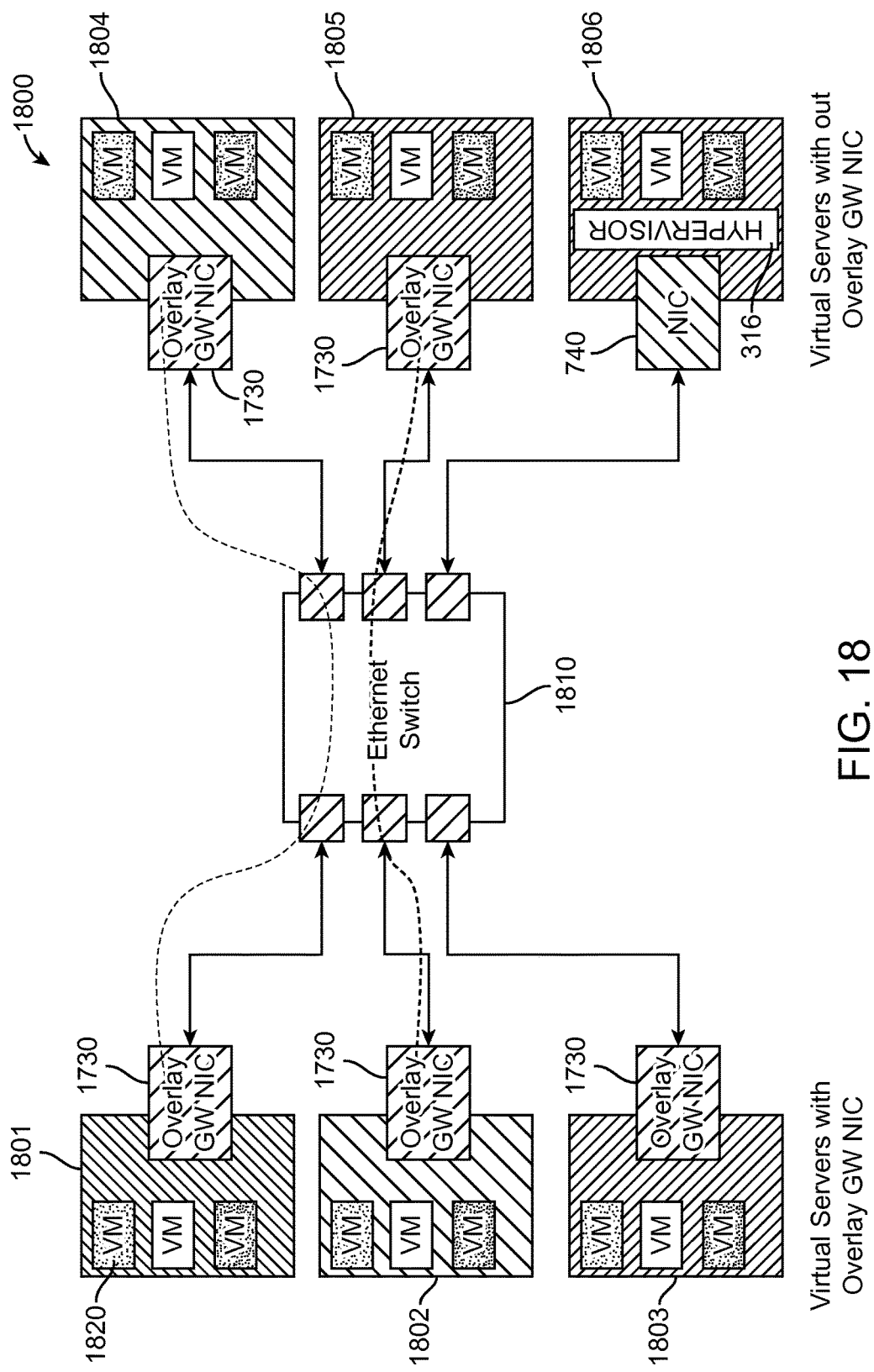
FIG. 18 is a block diagram showing a heterogeneous overlay network environment with ONA movement operations for overlay virtual networks, according to one embodiment of the invention.

FIG. 18 is a block diagram showing a heterogeneous overlay network 1800 environment of multiple virtual overlay networks with ONA movement operations for overlay virtual networks, according to one embodiment of the invention. In one embodiment, the example heterogeneous overlay network 1800 comprises multiple virtual overlay networks 1801, 1802, 1803, 1804, 1805 and 1806. In one embodiment, an Ethernet switch 1810 is connected with the physical NICs 1730 and 740. In one embodiment, the multiple virtual overlay networks 1801, 1802, 1803, 1804, 1805 and 1806 include multiple VNIDs or TNIDs that include multiple VMs 1820. In one example embodiment, the virtual overlay networks 1801, 1802, 1803, 1804 and 1805 include a physical NIC 1730 that includes overlay gateway functionalities that have been offloaded. In one embodiment, the virtual overlay network 1806 includes a hypervisor 316 connected to the physical NIC 740 and does not include any offloaded overlay gateway functionality (i.e., uses a gateway 1130 or 1530).

In one embodiment, the virtual overlay networks 1801, 1802, 1803, 1804, 1805 and 1806 use ONA movement operations (e.g., moving, creating, deleting, dividing, combining) for operating on overlay virtual domains in the heterogeneous overlay network 1800.

Figure 19:
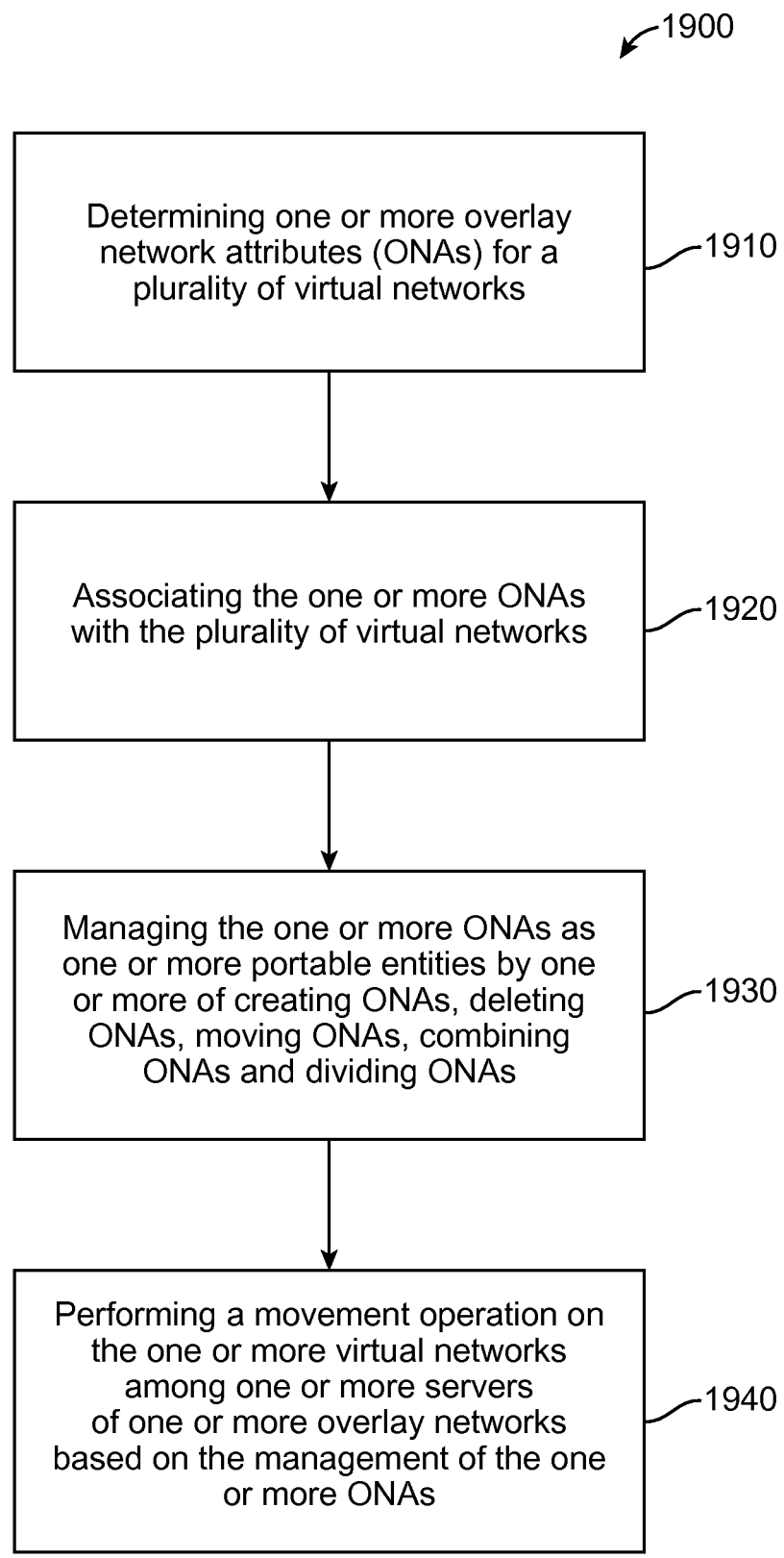
FIG. 19 is a block diagram of a process for virtual network movement operations, according to one embodiment of the invention.

FIG. 19 is a block diagram of a process 1900 for virtual network movement operations, according to one embodiment of the invention. In one embodiment, in block 1910 one or more overlay network attributes (e.g., ONAs 1001-1003, FIG. 10) are determined for a plurality of virtual networks (i.e., of one or more virtual overlay networks). In one embodiment, in block 1920 one or more ONAs are associated with the plurality of virtual networks. In one embodiment, in block 1930 the one or more ONAs are managed as one or more portable entities by one or more of creating ONAs, deleting ONAs, moving ONAs, combining ONAs and dividing ONAs. In one embodiment, in block 1940 a movement operation is performed on the one or more virtual networks among one or more servers of one or more overlay networks based on the management of the one or more ONAs.

In one embodiment, in process 1900 the movement operation of the one or more virtual networks is based on a triggered event, such as an administrator triggered event, a time triggered event, a resource requirement triggered event, etc. In one embodiment, the movement operation between the one or more virtual networks comprises one or more of moving the one or more virtual networks from a first server to a second server, creating the one or more virtual networks, deleting the one or more virtual networks, dividing the one or more virtual networks, and combining the one or more virtual networks.

In one embodiment, in the process 1900 dividing of the one or more virtual networks comprises splitting the one or more ONAs. In one embodiment, moving of the one or more virtual networks comprises movement of one or more business divisions as virtual networks from one geographical location to another geographical location. In one embodiment, the first overlay network and the second overlay network are heterogeneous overlay networks (e.g., VXLAN, NVGRE, etc.).

In one embodiment, in process 1900 managing the one or more overlay network attributes and movement operations are offloaded from an overlay gateway to an overlay network physical NIC (e.g., physical NIC 1730, FIGS. 17-18), and the physical NIC performs offloaded gateway functional operations. In one embodiment, the physical NIC performs overlay network offloaded operations and optionally supports VEPA operations.

The networks 400, 1100, 1500, 1700 and 1800 may include one or more source programs, executable programs (object code), scripts, or any other entity comprising a set of computer program instructions to be performed. When the networks 400, 1100, 1500, 1700 and 1800 include a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In one embodiment, where the networks 400, 1100, 1500, 1700 and 1800 are implemented in hardware, the networks 400, 1100, 1500, 1700 and 1800 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method comprising:
    determining overlay network attributes (ONAs) for a plurality of virtual networks, wherein the ONAs comprise a network identifier and tunnel information;
    associating the ONAs with the plurality of virtual networks;
    managing the ONAs as one or more portable entities by creating ONAs, deleting ONAs, moving ONAs, combining ONAs and dividing ONAs; and
    performing a movement operation comprising re-assigning the plurality of virtual networks to servers of overlay networks based on the management of the ONAs.

2. The method of claim 1, wherein the movement operation of the virtual networks is based on a triggered event, the network identifier comprises at least one of: a virtual network identifier (VNID) and a tenant identifier (TNID), and the tunnel information comprises tunnel identification, multicast group, address resolution protocol (ARP) information, virtual local area network (VLAN) information and sub-domain information.

3. The method of claim 2, wherein the triggered event is one of an administrator triggered event, a time triggered event, and a resource requirement triggered event.

4. The method of claim 3, wherein the movement operation of the virtual networks comprises moving the virtual networks from a first server to a second server, creating the virtual networks, deleting the virtual networks, dividing the virtual networks, and combining the virtual networks.

5. The method of claim 4, wherein dividing of the virtual networks comprises splitting corresponding ONAs, and the ONAs further comprise at least one of: virtual machine (VM) members and virtual port numbers.

6. The method of claim 5, wherein moving of the virtual networks comprises movement of business divisions as virtual networks from one geographical location to another geographical location.

7. The method of claim 6, wherein the overlay networks include a first overlay network and a second overlay network that are both heterogeneous overlay networks.

8. The method of claim 7, wherein managing the ONAs and movement operations are offloaded from a gateway to an overlay network physical network interface controller (NIC), and the NIC performs offloaded gateway functional operations.

9. The method of claim 8, wherein the NIC performs overlay network offloaded operations, and also supports virtual Ethernet port aggregator (VEPA) operations.

10. A computer program product for providing virtual network domain movement operations, the computer program product comprising a computer readable hardware storage device having program code embodied therewith, the program code readable/executable by a processor to perform a method comprising:
    determining, by a physical network interface controller (NIC), overlay network attributes (ONAs) for a plurality of virtual networks, wherein the ONAs comprise a network identifier and tunnel information;
    associating by the physical NIC, the ONAs to the plurality of virtual networks;
    managing, by the physical NIC, the ONAs as portable entities by creating ONAs, deleting ONAs, moving ONAs, combining ONAs and dividing ONAs; and performing a movement operation, by the physical NIC, comprising re-assigning the virtual networks to servers of overlay networks based on the management of the ONAs.

11. The computer program product of claim 10, wherein the movement operation of the virtual networks is based on a triggered event comprising at least one of an administrator triggered event, a time triggered event, and a resource requirement triggered event, the network identifier comprises at least one of: a virtual network identifier (VNID) and a tenant identifier (TNID), and the tunnel information comprises tunnel identification, multicast group, address resolution protocol (ARP) information, virtual local area network (VLAN) information and sub-domain information.

12. The computer program product of claim 11, wherein the movement operation on the virtual networks comprises:
moving the virtual networks from a first server of a first overlay network to a second server of a second overlay network, creating the virtual networks, deleting the virtual networks, dividing the virtual networks by splitting the overlay network attributes, and combining the virtual networks; and
the ONAs further comprise at least one of: virtual machine (VM) members and virtual port numbers.

13. The computer program product of claim 12, wherein the first overlay network and the second overlay network are heterogeneous overlay networks, managing the ONAs and movement operations are offloaded from a gateway to an overlay network physical network interface controller (NIC), and the NIC performs offloaded gateway functional operations.

14. The computer program product of claim 13, wherein moving of the virtual networks comprises movement of business divisions as virtual networks from one geographical location to another geographical location.

15. The computer program product of claim 14, wherein the NIC performs overlay network offloaded operations, and supports virtual Ethernet port aggregator (VEPA) operations.

16. A system comprising:
a hardware layer comprising a physical network interface controller (NIC);
virtual switches each associated with at least virtual machines (VMs) overlaying the hardware layer; and
a first server,
wherein the NIC determines overlay network attributes (ONAs) for a plurality of virtual networks, associates the ONAs with the plurality of virtual networks, manages the ONAs as portable entities by creating ONAs, deleting ONAs, moving ONAs, combining ONAs and dividing ONAs, and performs a movement operation comprising re-assigning the virtual networks to servers of overlay networks based on management of the ONAs, and the ONAs comprise a network identifier and tunnel information.

17. The system of claim 16, wherein the movement operation of the virtual networks is based on a triggered event comprising at least one of: an administrator triggered event, a time triggered event, and a system resource requirement triggered event, the network identifier comprises at least one of: a virtual network identifier (VNID) and a tenant identifier (TNID), and the tunnel information comprises tunnel identification, multicast group, address resolution protocol (ARP) information, virtual local area network (VLAN) information and sub-domain information.

18. The system of claim 17, wherein a movement operation comprises:
moving the virtual networks from a first server of a first overlay network to a second server of a second overlay network, creating the virtual networks, deleting the virtual networks, dividing the virtual networks by splitting the ONAs, and combining the virtual networks; and
the ONAs further comprise at least one of: virtual machine (VM) members and virtual port numbers.

19. The system of claim 18, wherein the first overlay network and the second overlay network are heterogeneous overlay networks, managing the overlay network attributes and movement operations are offloaded from a gateway to the NIC, and the NIC performs offloaded gateway functional operations.

20. The system of claim 19, wherein the NIC performs overlay network offloaded operations, and supports virtual Ethernet port aggregator (VEPA) operations, multiple virtual networks form a domain, and the movement operation comprises a movement operation performed on the domain.

* * * * *